C. M. GORDON-GLASSFORD.
CONVERTIBLE TRUNK.
APPLICATION FILED MAY 8, 1912.

1,057,723.

Patented Apr. 1, 1913.

4 SHEETS—SHEET 1.

Witnesses:
B. Dommers
E. Leckert.

Inventor.
Clara May Gordon Glassford,
By Henry Orth Jr.
atty.

C. M. GORDON-GLASSFORD.
CONVERTIBLE TRUNK.
APPLICATION FILED MAY 8, 1912.

1,057,723.

Patented Apr. 1, 1913.

4 SHEETS—SHEET 2.

Witnesses:
B. Dommers
E. Lickert

Inventor
Clara May Gordon Glassford
By Henry Orth Jr.
atty.

C. M. GORDON-GLASSFORD.
CONVERTIBLE TRUNK.
APPLICATION FILED MAY 8, 1912.

1,057,723.

Patented Apr. 1, 1913.

4 SHEETS—SHEET 3.

Witnesses:
B. Dommers
E. Leckert.

Inventor.
Clara May Gordon-Glassford
By Henry Orth Jr.
atty.

C. M. GORDON-GLASSFORD.
CONVERTIBLE TRUNK.
APPLICATION FILED MAY 8, 1912.

1,057,723.

Patented Apr. 1, 1913.

4 SHEETS—SHEET 4.

Witnesses:
B. Sommers
E. Leckert

Inventor:
Clara May Gordon-Glassford
By Henry Ott
atty.

UNITED STATES PATENT OFFICE.

CLARA MAY GORDON-GLASSFORD, OF BAIRNSDALE, VICTORIA, AUSTRALIA.

CONVERTIBLE TRUNK.

1,057,723. Specification of Letters Patent. Patented Apr. 1, 1913.

Application filed May 8, 1912. Serial No. 695,932.

*To all whom it may concern:*

Be it known that I, CLARA MAY GORDON-GLASSFORD, a subject of the King of Great Britain, residing at Bairnsdale, in the State of Victoria, Commonwealth of Australia, married woman, have invented certain new and useful Improvements in Convertible Trunks, of which the following is a specification.

This invention consists of a convertible traveling trunk or chest in which clothes or other articles may be packed, and which, when emptied may be readily converted into useful articles such as an extension cot, child's chair with tray and commode seat combined, and a child's push cart.

The trunk is especially devised for persons traveling with children.

Figure 1:
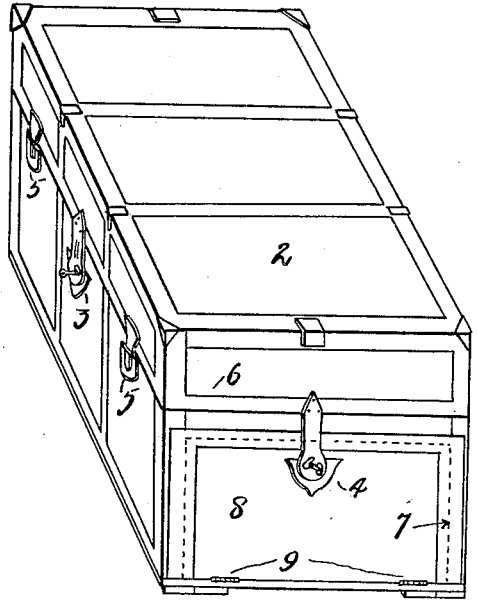
Figure 2:
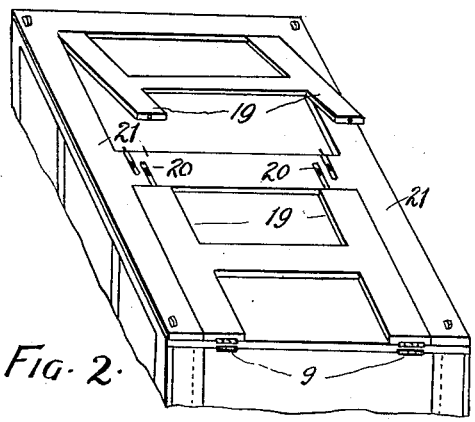
Figure 15:
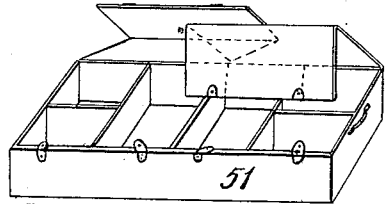
Figure 3:
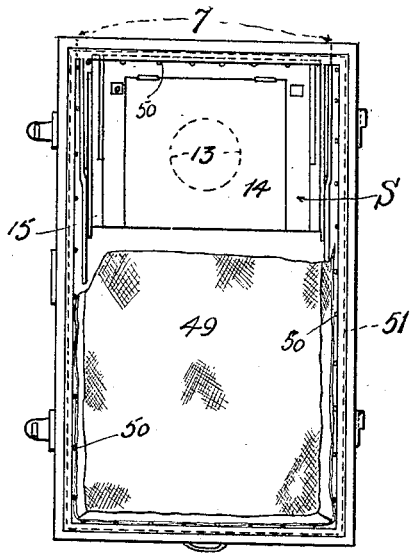
Figure 4:
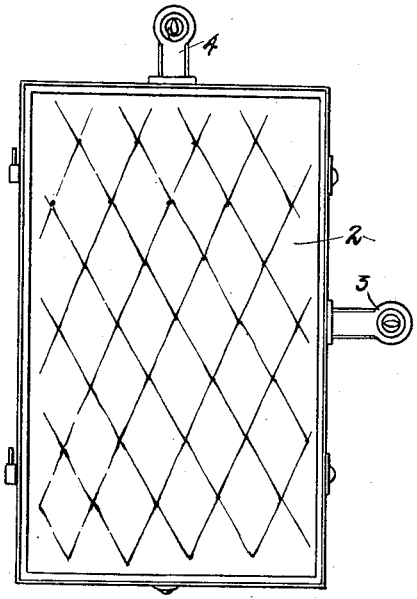
Figure 5:
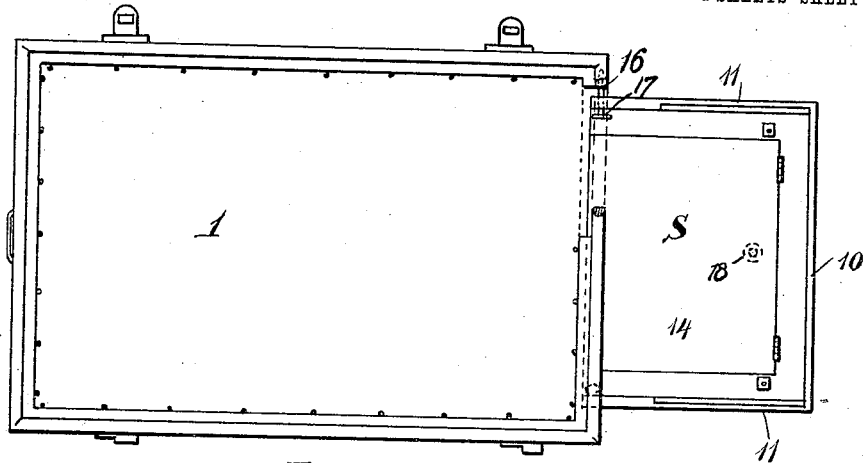
Figure 6:
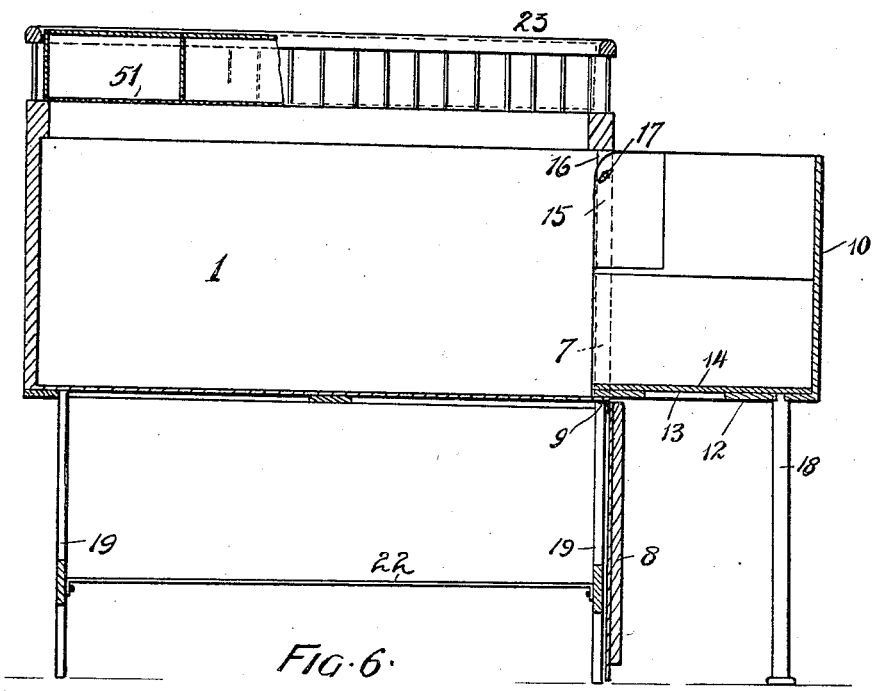
Figure 7:
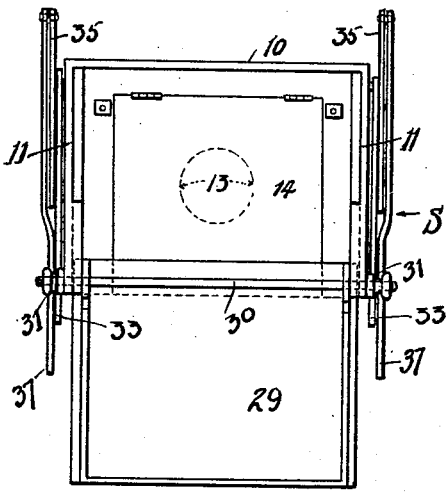
Figure 8:
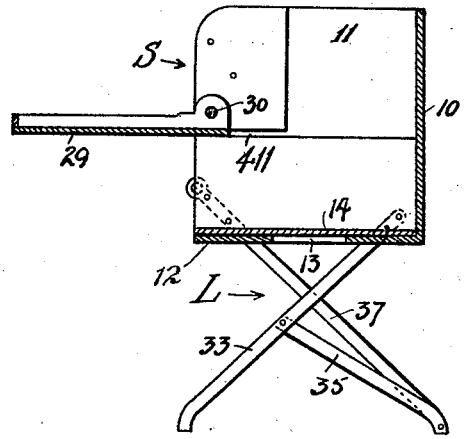
Figure 9:
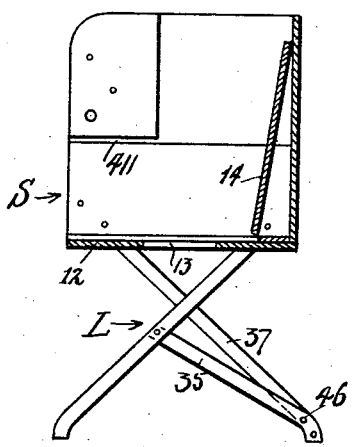
Figure 10:
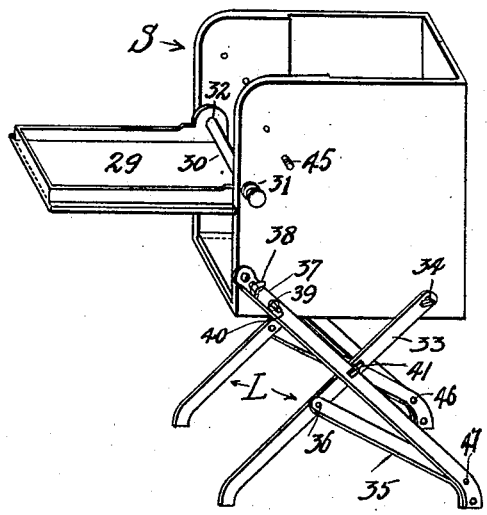
Figure 11:
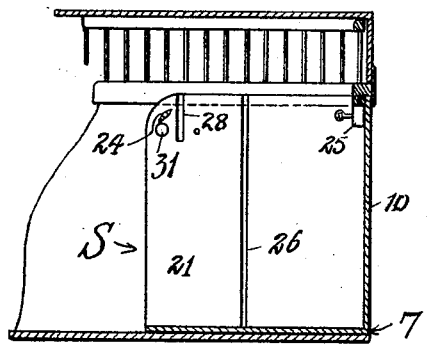
Figure 12:
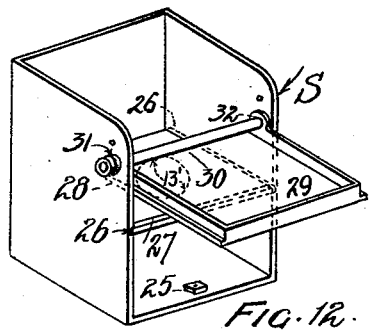
Figure 13:
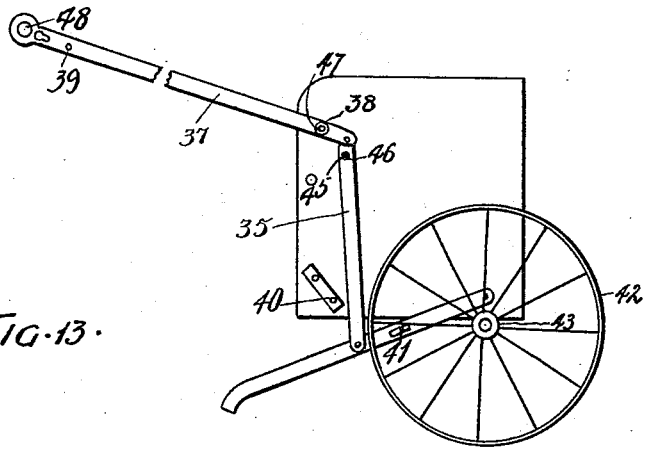
Figure 14:
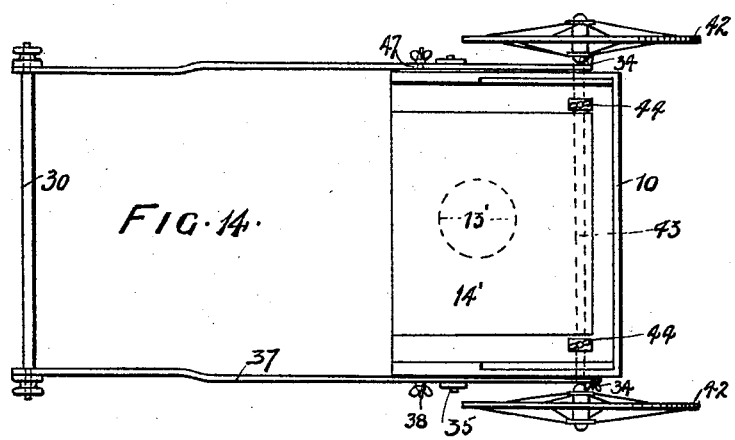

The invention is illustrated by the accompanying drawing, which comprise Figure 1 a perspective view of the trunk, Fig. 2 a perspective view of the underside thereof, Fig. 3 a plan of the body portion with lid removed, and Fig. 4 an underside plan of the lid, drawn to a reduced scale, Fig. 5 a plan, and Fig. 6 a longitudinal vertical section showing the trunk converted into an extension cot, Fig. 7 a plan of the child's seat with tray, Fig. 8 a vertical section through the seat, Fig. 9 a vertical section illustrating the use of the seat as a commode, Fig. 10 a perspective view of the seat, Fig. 11 a vertical section through the trunk illustrating a modified construction thereof, and Fig. 12 a perspective view of the child's seat detached, Fig. 13 a side elevation showing the seat converted into a push cart, and Fig. 14 a plan thereof, and Fig. 15 a perspective view of a tray.

According to this invention the body portion 1 of the trunk is provided with a hinged and removable top 2 secured by locks 3, 4, and other fastening devices, 5.

One end of the body portion is formed with an opening 7, and according to one embodiment of the invention, said opening is normally closed by an end 8, hinged as at 9 so as to swing down and permit a seat S to be drawn partly or entirely out of the body portion. This seat is provided with a back 10 and two sides 11, 11, and the bottom 12 is formed with a commode opening 13 with a hinged flap 14 over same, and said seat is nested in one end of the body portion as in Fig. 3 and adapted to fit same snugly so as to occupy a minimum of space.

In order to convert the body portion into an extension cot as shown in Figs. 5 and 6, this seat is drawn out and the front ends 15 of its sides are secured to the frame 16 around the opening 7 in the body portion by thumb screws or the like 17 and it is supported upon a central removable screwed leg 18, carried in the trunk, while the body portion is supported on hinged or folding legs 19, 19. The legs are secured by bolts 20 between the framing 21 of the bottom of the trunk as in Fig. 2, so that they are flush with the bottom thereof and when extended they are preferably stiffened by a brace 22 carried in the trunk.

In order to provide free air passages for the occupant of the cot, the top edge of the body portion of the trunk is preferably formed with a perforated railing 23.

If preferred the hinged end 8 of the body portion may be dispensed with in which case the back 10 of the seat S is removably secured to the frame of the trunk by screws 24 and a lock 25 or other convenient means so as to form one end thereof of the body portion as in Fig. 11.

When required to be converted into a seat for a child, it may be removed from the trunk portion and according to the embodiment illustrated in Figs. 11 and 12 the seat is turned on end. The sides are provided on the inside with guideways 26 into which is slid a seat bottom 27 Fig. 12 formed with a commode opening 13′ provided with a hinged cover flap 14′. Furthermore other guideways 28 are provided in the sides of the seat into which is slid a ledged tray 29 which is secured by a bar 30 passed through holes 31, 32 formed respectively in the sides of the seat and in the sides of the tray.

In the case where the seat is separated from the hinged end 8 as in Figs. 7, 8, 9 and 10, it is, when removed from the trunk, raised off the ground and provided on the sides with collapsible or folding legs L, which when the seat is in the trunk, lie on the bottom thereof. These legs each comprise a bar 33 pivoted upon a removable screw 34 to the side of the seat, a link 35 pivoted as at 36 to said bar and pivoted at its outer or lower end to another bar 37 adapted to be removably secured to the side of the seat by a bolt 38 with a wing nut and provided with a hole 39 which fits over a stud 40 on the side of the seat. In order to limit the spread of the legs and insure rigidity, the bar 33 has a hook 41 with which the other bar 37 engages.

The inner face of the sides of the seat are provided with guideways 41 into which is slid the ledged tray 29 and the latter is fastened by the bar 30 passed through holes 31 in the seat sides and corresponding holes 32 in the sides of the tray. It will be evident that the seat so fitted up may be used as a commode by raising the flap.

If desired the seat S may be converted into a child's push cart as in Figs. 13 and 14, and for this purpose a pair of detachable wheels 42, and an axle 43, are conveniently packed in the trunk. The wheels are attached to the ends of the axle in the usual way, the axle being secured to the bottom of the seat by bolts 44 passed through holes in said seat secured by wing nuts or the like.

The legs and handle are provided by swinging the bar 37 and link 35 on each side into the position shown in Figs. 13 and 14 and fitting a stud 45 provided on each side of the seat into a hole 46 provided in the link while said bar is fastened by the bolt 38 for which purpose the bar is formed about its inner end with a hole 47. The outer ends of the bars are formed with holes 48 through which the bar 30 or another similar bar is passed and fixed to form the handle of the push cart.

The seat S and other loose parts, such as the leg, bar, wheels, axle, brace bolts are covered when packed in the trunk for transit by means of a lining 49, Fig. 3, detachably fastened by spring buttons 50 to the inside of the trunk. By preference moreover a removable partitioned tray 51 Fig. 15 is fitted within the railing 23 on the edge of the body portion, as shown in Fig. 6.

What I do claim as my invention and desire to secure by Letters Patent is:—

1. A convertible trunk comprising a body portion, a seat nested in said body portion and adapted to form an extension of the bottom and be converted into a commode, and legs for supporting said body portion and seat.

2. A convertible trunk comprising a body portion formed with a removable top and with a normally closed framed opening in the end, a seat nested in said body portion and adapted to be drawn out of the body and secured at its front end to the frame thereof to form an extension of the bottom, and legs for supporting said body portion and seat bottom in substantially the same plane, the whole being adapted to form an extension cot.

3. A convertible trunk comprising a body portion formed with a removable top and with a normally closed framed opening in the end, a seat nested in said body portion and having a bottom and sides adapted, when drawn out to form an extension of the bottom and sides of the body, means to secure the seat at its front end to the frame, a removable leg adapted to support the bottom of said seat in substantially the plane of the bottom of the body, and collapsible legs on said body portion.

4. A convertible traveling trunk comprising a body portion, a nested seat therein adapted to be drawn out of same and turned on end and formed with guideways adapted to receive a seat board formed with a commode opening and provided with a hinged cover flap, for the purpose specified.

5. A convertible trunk comprising a body portion, a seat nested therein and adapted to be drawn therefrom and formed with a back, two sides and a bottom, bars removably pivoted to the sides of the seat, links adapted to connect said bars, and means to connect said bars and links to the seat in different positions.

6. A convertible traveling trunk comprising a body portion, a seat nested therein and adapted to be drawn out of same and formed with a back, two sides and a bottom, said bottom being formed with a commode opening covered by a hinged flap, and folding legs on the sides of said seat, for the purpose specified.

In testimony whereof I have hereunto set my hand in presence of two subscribing witnesses.

CLARA MAY GORDON-GLASSFORD.

Witnesses:
ARTHUR HENRY PRICE,
WILLIAM GUEST HOLDEN.